United States Patent [19]

Klein-Doepke et al.

[11] 3,865,901

[45] Feb. 11, 1975

[54] RESINOUS COATING COMPOSITIONS HARDENABLE BY HIGH ENERGY RADIATION

[75] Inventors: Wolfgang Klein-Doepke, Darmstadt; Wilhelm Elser, Graefenhausen; Peter Quis; Peter Rossberg, both of Darmstadt, all of Germany

[73] Assignee: Rohm GmbH, Darmstadt, Germany

[22] Filed: Jan. 4, 1973

[21] Appl. No.: 321,006

[30] Foreign Application Priority Data

Jan. 3, 1972 Germany............................ 2200013

[52] U.S. Cl.......... 260/871, 117/93.31, 204/159.15, 260/872
[51] Int. Cl. ............................................ C08f 21/00
[58] Field of Search ........ 204/159.15; 260/871, 872

[56] References Cited
UNITED STATES PATENTS 3,644,161   2/1972   Hall ................................... 156/272
3,760,033   9/1973   Arbuckle et al.................... 260/872

FOREIGN PATENTS OR APPLICATIONS 2,003,121   7/1970   Germany
766,666     1/1957   Great Britain..................... 260/871

*Primary Examiner*—William H. Short
*Assistant Examiner*—E. A. Nielsen
*Attorney, Agent, or Firm*—Curtis, Morris & Safford

[57] ABSTRACT

Coating compositions, hardenable by exposure to high-energy radiation such as $\beta$-rays, comprising, as the radiation-hardenable binder component thereof, a mixture of (a) 40 to 90 percent, by weight of said mixture, of an unsaturated polyester having free-radical polymerizable olefinic unsaturations in a position $\alpha,\beta$ to an ester carbonyl group, and (b) 60 to 10 percent, by weight of said mixture, of a monomer component comprising at least 80 percent by weight of alkoxyalkyl esters of acrylic acid or methacrylic acid or mixtures of said esters with up to an equal amount by weight of hydroxyalkyl esters of acrylic acid or methacrylic acid.

7 Claims, No Drawings

RESINOUS COATING COMPOSITIONS HARDENABLE BY HIGH ENERGY RADIATION

The present invention relates to resinous coating compositions adaptable to hardening by high-energy radiation.

Conventional lacquers containing highly volatile solvents have a number of basic disadvantages. The solvent vapors are as a rule flammable and toxic. For these reasons, but also for reasons of cost, it is necessary to recover the evaporated solvent. The arrangements required for this are relatively expensive. In order to overcome this disadvantage, it has long been sought to develop solvent-free coating masses. These attempts have led, among other things, to the development of polymerizable coating agents hardenable by irradiation with electrons. Coating agents of this kind have until now fallen far short of the quality of the known systems containing a solvent.

The hardening of mixtures comprising polyesters and vinyl monomers with the aid of electron beams is described in German Pat. No. 956,542, granted in the year 1953. The latest state of the art is disclosed in Belgian Pat. No. 694,782. In the latter, certain limits on the molecular weight and on the number of unsaturated groups in the polyesters present in its mixtures are described as optimum. The polyesters are applied to the substrate to be covered together with ethylenically unsaturated monomers, such as styrene or the esters of acrylic acid or methacrylic acid with monohydroxy or polyhydroxy alcohols, and are irradiated. The mixtures contain as a rule more than 50 percent by weight of relatively low-boiling monomers, particularly of styrene or methyl methacrylate. These monomers evaporate to a considerable extent during polymerization and give rise to just those disadvantages which are sought to be overcome by the use of coating agents free of solvents. The evaporation of the monomers can be hindered by the use of predominantly or exclusively high-boiling monomers. As such monomers, the monoesters or diesters of acrylic acid or methacrylic acid with polyols come most under consideration. However, the diesters lead to a strong cross-linking of the coating and produce brittle lacquer layers. The monoesters, such as hydroxyethyl methacrylate, give solutions of relatively high viscosity which, with an increasing proportion of these esters, show increasingly bad hardening behavior. In particular, in order to achieve sufficient hardening, a radiation dosage must be employed which can lead to uncontrolled decomposition phenomena.

Solution-free coating agents are known from German Offenlegungsschrift DOS No. 2,003,121. These comprise polyesters containing a norbornenyl group and certain acrylic acid esters or methacrylic acid esters. Among these esters, those derived from a higher alcohol or substituted alcohol and having a relatively high boiling point are preferred. 2-ethylhexyl acrylate, tetramethylene diacrylate, neopentylglycol diacrylate, phenylethyl acrylate, phenoxyethyl acrylate, butoxyethyl acrylate, dicyclopenteneoxyhexyl acrylate, and others are mentioned as exemplary. These coating agents do not harden under a radiation dose suitable for a technical process, i.e., about 5 – 15 Mrad. Rather, soft, sticky layers are formed.

According to the present invention, it has been found that, surprisingly, mixtures which, per 100 parts, comprise (a) 40 to 90 parts by weight of unsaturated polyesters having an unsaturated free-radical polymerizable group in a position $\alpha,\beta$ to a carbonyl group and (b) 60 to 10 parts by weight of polymerizable monomers of which 80 to 100 percent by weight are alkoxyalkyl esters of acrylic acid or methacrylic acid, or mixtures thereof with at most the same amount of hydroxyalkyl esters of acrylic acid or methacrylic acid, and 0 to 20 percent may be other polymerizable monomers, are binders for radiation-hardenable coatings. The binders as a rule have a viscosity of less than 2,000 centipoises, which is particularly advantageous for working with the materials, and give well-hardened coatings at a radiation dosage of, for example 10 Mrad. From the point of view of lacquer technology, these coatings are comparable with those which can be prepared with good coating agents containing solvents. This result is surprising because neither those systems which contain conventional unsaturated polyesters and vinyl monomers such as hydroxyalkyl esters of acrylic acid or methacrylic acid, nor those systems which contain polyesters with norbornenyl groups and alkoxyalkyl esters of acrylic acid or methacrylic acid, give similar good results either with respect to hardening or quality of the lacquer.

The unsaturated polyesters found in the coating agents according to the invention are preferably products known in current technology which, as a rule, are used with predominant amounts of styrene. Their unsaturated free-radical polymerizable groups are mostly contained in the acid residues of maleic or fumaric acid. (Fumaric acid groups may be formed from maleic acid starting materials under the polymerization conditions used in preparing the polyesters.) In all these cases, the unsaturated free radical polymerizable group stands in an $\alpha,\beta$-position to a carbonyl group, specifically to an ester carbonyl. More than 90 percent of the free radical polymerizable unsaturated groups of the polyesters are preferably in this configuration and are as a rule even completely in this configuration. In addition, the polyesters in many cases contain acid residues of phthalic acid or isophthalic acid; of saturated aliphatic dicarboxylic acids, preferably having 4 to 8 carbon atoms; or of long-chain unsaturated monocarboxylic acids. These acids are esterified with aliphatic glycols, preferably alkylene diols having 1 – 4 or 1 – 5 carbon atoms such as ethylene glycol, propane diol-1,2, butane diol-1,4, and neopentyl glycol; with glycols of the formula

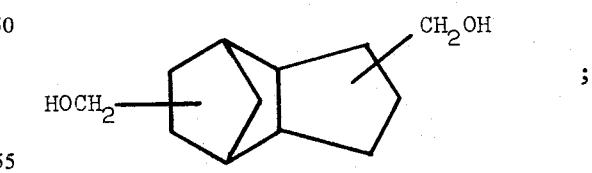

or with aliphatic polyols such as glycerin or pentaerythritol. The molecular weight of these polyesters is of little importance to the properties of the hardened coatings since, in any case, strong cross-linking occurs during hardening. However, in the interest of good workability, it has proved desirable to employ polyesters having a molecular weight of at least 2,000 and not more than 20000.

In contrast to these aforementioned polyesters, which are well known in the art, those polyesters which are used in DOS No. 2,003,121 for the preparation of coating agents hardenable by electron radiation contain unsaturated groups which for the most part are in norbornenyl groups, i.e., in an unsaturated bicyclic system. These unsaturations do not stand in a position $\alpha,\beta$ to a carbonyl group.

The amount of the polyester in the binder according to the present invention depends on the molecular weight of the polyesters employed and on the desired viscosity of the coating agent. In the unpigmented condition, the viscosity of the binder is at most 2,000 centipoises, a viscosity from 100 to 1,000 centipoises is particularly preferred. The measurements of viscosity are made in known fashion using a rotation-viscometer. Binding agents of the aforementioned low viscosity flow well and impart a good gloss to the hardened coatings.

The monomer fraction of the coating agent preferably comprises alkoxyalkyl esters of acrylic acid or methacrylic acid alone. The acrylic acid esters are especially preferred. Methoxymethyl acrylate, methoxybutyl acrylate, methoxydecyl acrylate, ethoxyethyl acrylate, butoxyethyl acrylate, butoxypropyl acrylate, hexoxyethyl acrylate, and the corresponding methacrylates are mentioned as examples of materials of this type in which the alkoxy group has up to 6 carbon atoms and the alkyl group has up to 10 carbon atoms. These esters can also be employed in combination with hydroxyalkyl esters of acrylic acid or methacrylic acid, preferably hydroxy lower alkyl esters thereof such as glycol monomethacrylate, butane diol monoacrylate, 1,2-propylene glycol methacrylate, and others. However, the amount of these last-mentioned esters should not be larger than the amount of the previously-mentioned alkoxyalkyl esters.

Other free-radical polymerizable vinyl and vinylidene monomers such as styrene, maleic acid anhydride, acrylic acid or methacrylic acid, divinyl benzene, ethylene glycol dimethacrylate, and the like may be employed but, if present, should not exceed 20 percent of the monomer component of the binder.

A high proportion of the monomer component in the binder requires a relatively large radiation dose for complete hardening, namely about 15 to 30 Mrad. However, systems of this type have the advantage that they can be compounded to have rather low viscosities, particularly if, at the same time, a polyester of relatively low molecular weight is employed. With increasing molecular weight of the polyester, and with a decreasing fraction of monomer component in the binder mixture, viscosity increases. It is, therefore, not advantageous simultaneously to use a polyester of high molecular weight and a high fraction of polyester, even if such systems require the lowest radiation dosages for hardening.

In addition to the binder described above, the coating agents of the invention as a rule contain pigments and other additives such as soluble dyestuffs, stabilizers, ultraviolet protective agents, fillers, and optional plasticizers. Also, further polymers, such as cellulose esters for example, can be present. For all the additives, and particularly for soluble additives, it should be determined by preliminary tests whether they influence the hardening or are themselves damaged by radiation.

The coating masses are applied to the object to be coated by painting, spraying, dipping, rolling, or spreading. The substrate may be metal, wood, or plastic, for example, and the materials are applied in a layer thickness of 6 – 300 microns and then hardened by high energy ionizing radiation.

$\alpha$-, $\beta$-, or $\gamma$- rays can be used as the hardening radiation. However, the depth of penetration of $\alpha$-particles may be insufficient for hardening thick coatings, and $\gamma$-rays may be too penetrating. As the radiation source, electron beam generators which produce electrons of an energy from 100,00 to 500,000 electron volts, preferably about 300,000 electron volts, are advantageously used. A dosage of from 1 – 20 Mrad is effectively employed. Irradiation suitably takes place at room temperature. However, radiation can also take place at higher or lower temperatures, for example in the range from 0° – 80°C. The exclusion of air during the hardening process is as a rule not necessary. However, in certain cases in which a satisfactory hardening is not attained in the presence of air, its exclusion may be advantageous. Either a single coating layer can be produced or also several layers, optionally different layers, can be applied.

A better understanding of the present invention and of its many advantages will be had by referring to the following specific examples given by way of illustration.

EXAMPLE 1

A mixture of equal parts by weight of methoxyethyl acrylate and of an unsaturated polyester resin comprising about 48 parts by weight of maleic acid anhydride and 52 parts by weight of phthalic acid anhydride condensed with a corresponding amount of propane diol-1,2 (commercially available under the tradename "Ludopal P 6 M"), and having a viscosity of 100 centipoises at 20°C., is applied to sheet steel and hardened in nitrogen with electron radiation of an intensity of 20 Mrad.

The hardness of the layer, measured by a pendulum hardness test (DIN 53157), was 155 seconds. The Erichsen indentation test (DIN 53156) give a value > 9 mm. The cross-cut test for adhesion (DIN 53151) gives a value of 0.

EXAMPLE 2

A mixture of the same components as in Example 1 wherein, however, the proportion of methoxyethyl acrylate is only 40 percent by weight and that of the polyester is 60 percent by weight, is hardened under the same conditions as in Example 1. The viscosity of the mixture before hardening is 500 centipoises at 20°C. The values determined from the pendulum hardness, Erichsen indentation, and cross-cut tests are the same as in Example 1.

EXAMPLE 3

Example 2 is repeated with the difference that the unsaturated polyester is one comprising maleic acid anhydride, phthalic acid anhydride, adipic acid, and propane diol-1,2 (commercially available under the tradename "Roskydal W 15"). The mixture has a viscosity of 300 centipoises. The following properties were determined. Pendulum hardness, 120 seconds; Erichsen identation, > 9 mm; cross-cut value 0.

EXAMPLE 4

A mixture comprising 60 percent by weight of the unsaturated polyester resin of Example 3, 28 percent by weight of methoxyethyl acrylate, and 12 percent by weight of 1,2-hydroxypropyl acrylate, having a viscosity of 600 centipoises at 20°C., is applied to sheet steel and hardened under nitrogen at an electron beam intensity of 20 Mrad.

The hardened coating has a pendulum hardness of 120 seconds, an Erichsen value > 9 mm, and a cross-cut test value of 0.

Coatings of substantially similar properties are obtained if, instead of the above polyester resin, one is used wherein the propane diol-1,2 component is replaced by an equimolar mixture of ethylene glycol and butane diol-1,4. Under the same hardening conditions, the tests applied showed a pendulum hardness of 115 seconds, an Erichsen value > 9 mm, and a cross-cut adhesion test value of 0.

For purposes of comparison, a polyester resin is prepared according to the teachings of German Pat. DOS No. 2,003,121 from an unsaturated polyester (prepared from 48 parts by weight of maleic acid anhydride, 52 parts by weight of phthalic acid anhydride, and the corresponding amount of propane diol-1,2) by the Diels-Alder addition of cyclopentadiene. The resin contains units of the structure

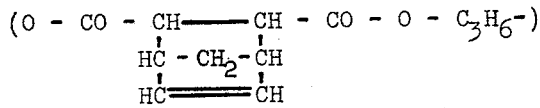

The resin was applied to sheet steel and hardened by irradiation with electrons at an intensity of 20 Mrad. The coating is very soft and adheres badly. The pendulum hardness is 16 - 20 seconds, which is totally insufficient from a practical viewpoint. The Erichsen indentation test and cross-cut test were not carried out.

EXAMPLE 5

A mixture of 60 percent by weight of the unsaturated polyester resin of Example 4, 17.5 percent by weight of ethoxyethyl acrylate, 17.5 percent of hydroxypropyl acrylate, and 5 percent of styrene having a viscosity of 800 centipoises at 20°C. is applied to sheet steel and hardened under nitrogen with an electron beam of 20 Mrad intensity.

The pendulum hardness of the hardened coating is 125 seconds, the Erichsen test value is > 9 mm, and the cross-cut test gives a characteristic value of 0.

EXAMPLE 6

A mixture of equal parts by weight of methoxyethyl acrylate and of an unsaturated polyester resin comprising maleic acid anhydride, phthalic acid anhydride, adipic acid, and corresponding amounts of a diol of the formula

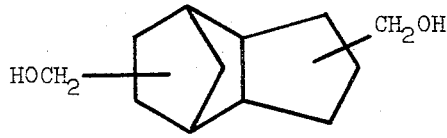

(commercially available under the tradename "Synthetic Resin LTH") having a viscosity of 500 centipoises is hardened with an electron beam of 15 Mrad intensity in air without a protective atmosphere.

The following properties are measured on the hardened coating: Pendulum hardness: 80 seconds; Erichsen: > 9 mm;
Cross-cut test: characteristic value 0.

EXAMPLE 7

A mixture of 55 percent by weight of the unsaturated polyester resin of Example 4 and 45 percent by weight of methoxy ethyl acrylate having a viscosity of 2,000 centipoises at 20°C. is applied to sheet steel and hardened under nitrogen with an electron beam of an intensity of 5 Mrad.

The following properties are measured on the hardened coating: Pendulum hardness: 80 seconds;
Erichsen: > 9 mm
Cross-cut test: characteristic value 0.

What is claimed is:

1. A resinous coating composition, hardenable by exposure to high-energy radiation, comprising, as the radiation-hardenable binder component thereof, a mixture of: (a) 40 to 90 percent, by weight of said binder component, of unsaturated polyester having olefinic bonds, polymerizable by free-radical polymerization, in a position $\alpha,\beta$ to an ester carbonyl group from a dicarboxylic acid; and (b) 60 to 10 percent, by weight of said binder component, of a member selected from the group consisting of (i) alkoxyalkyl esters of acrylic acid and methacrylic acid, (ii) mixtures of said esters with up to an equal amount by weight of an hydroxyalkyl ester of acrylic acid or methacrylic acid, and (iii) mixtures of (i) or (ii) with up to 20 percent, by weight of said mixtures, of at least one further, different, vinyl or vinylidene monomer.

2. A coating composition as in claim 1 wherein at least 90 percent of the free-radical polymerizable olefinic bonds of said unsaturated polyester (a) are in a position $\alpha,\beta$ to an ester carbonyl group.

3. A coating composition as in claim 1 wherein said unsaturated polyester is an ester formed between at least one acid component selected from the group consisting of maleic acid, maleic acid anhydride, fumaric acid, phthalic acid, isophthalic acid, and saturated aliphatic dicarboxylic acids having 4 to 8 carbon atoms, and at least one hydroxylic component selected from the group consisting of alkylene diols having 1 to 5 carbon atoms and alcohols of the formula

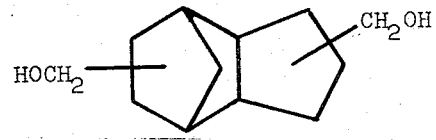

4. A coating composition as in claim 3 wherein the hydroxylic component of said unsaturated polyester is an alcohol of the formula

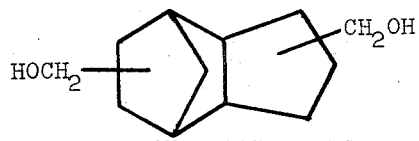

5. A coating composition as in claim 1 wherein said binder has a viscosity less than 2,000 centipoises at 20°C.

6. A coating composition as in claim 1 wherein said binder has a viscosity between 100 and 1,000 centipoises at 20°C.

7. A radiation-hardenable binder for resinous coating compositions, existing essentially of a mixture of (a) 40 to 90 percent, by weight of said binder component, of unsaturated polyester having olefinic bonds, polymerizable by free-radical polymerization, in a position α,β to an ester carbonyl group from a dicarboxylic acid; and (b) 60 to 10 percent, by weight of said binder component, of a member selected from the group consisting of (i) alkoxyalkyl esters of acrylic acid and methacrylic acid, (ii) mixtures of said esters with up to an equal amount by weight of an hydroxyalkyl ester of acrylic acid or methacrylic acid, and (iii) mixtures of (i) or (ii) with up to 20 percent, by weight of said mixtures, of at least one further, different, vinyl or vinylidene monomer.

* * * * *